US012633988B2

(12) United States Patent
Goyal et al.

(10) Patent No.: US 12,633,988 B2
(45) Date of Patent: May 19, 2026

(54) METHODS FOR MEASUREMENT REPORTING VIA CHANNEL STATE INFORMATION ACTIVATION OR DEACTIVATION

(71) Applicant: Nokia Technologies Oy, Espoo (FI)

(72) Inventors: Sanjay Goyal, Murray Hill, NJ (US); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/930,639

(22) Filed: Oct. 29, 2024

(65) Prior Publication Data

US 2025/0150141 A1    May 8, 2025

Related U.S. Application Data

(60) Provisional application No. 63/595,673, filed on Nov. 2, 2023.

(51) Int. Cl.
H04W 24/10 (2009.01)
H04B 7/06 (2006.01)

(52) U.S. Cl.
CPC .......... H04B 7/0626 (2013.01); H04W 24/10 (2013.01)

(58) Field of Classification Search
CPC ............................ H04B 7/0626; H04W 24/10
See application file for complete search history.

(56) References Cited

U.S. PATENT DOCUMENTS

| | | |
|---|---|---|
| 11,510,085 B2 | 11/2022 | Yang et al. |
| 11,558,765 B2 | 1/2023 | Maattanen et al. |
| 2020/0127796 A1 | 4/2020 | Li et al. |
| 2022/0030480 A1 | 1/2022 | Kung et al. |
| 2023/0199571 A1 | 6/2023 | Alireza |
| 2024/0276445 A1* | 8/2024 | Freda .................... H04W 24/10 |
| 2024/0284277 A1* | 8/2024 | Jeon ................. H04W 36/0072 |
| 2024/0334538 A1* | 10/2024 | Zhou ................. H04W 52/0216 |

(Continued)

FOREIGN PATENT DOCUMENTS

| | | |
|---|---|---|
| CN | 116368843 A | 6/2023 |
| CN | 116830748 A | 9/2023 |

(Continued)

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.6.0, Sep. 2023, pp. 1-211.

(Continued)

*Primary Examiner* — Chuong A Ngo
(74) *Attorney, Agent, or Firm* — ALSTON & BIRD LLP

(57) ABSTRACT
Systems, methods, apparatuses, and computer program products for supporting periodic and SP reporting on PUCCH. One method may include a UE receiving, from a network entity, at least one LTM CSI reporting configuration via radio resource configuration; receiving, from the network entity, at least one control message configured to activate or deactivate at least one of the at least one LTM CSI reporting configuration, and transmitting, to the network entity, L1 measurement reporting according to at least one of the at least one control message.

18 Claims, 10 Drawing Sheets

(56)        References Cited

U.S. PATENT DOCUMENTS

| | | |
|---|---|---|
| 2025/0071648 A1 | 2/2025 | Hong |
| 2025/0088926 A1 | 3/2025 | Hong |
| 2025/0119924 A1 | 4/2025 | Soenghun |
| 2025/0126534 A1 | 4/2025 | Soenghun |

FOREIGN PATENT DOCUMENTS

| | | |
|---|---|---|
| CN | 116965098 A | 10/2023 |
| CN | 116980083 A | 10/2023 |
| CN | 117546518 A | 2/2024 |
| KR | 2023-0105312 A | 7/2023 |
| WO | 2018/173002 A1 | 9/2018 |
| WO | 2023/128726 A1 | 7/2023 |
| WO | 2023/128727 A1 | 7/2023 |
| WO | 2023/137695 A1 | 7/2023 |
| WO | 2023/147869 A1 | 8/2023 |
| WO | 2023/152796 A1 | 8/2023 |
| WO | 2023/206008 A1 | 11/2023 |
| WO | 2023/208460 A1 | 11/2023 |
| WO | 2024/156187 A1 | 8/2024 |
| WO | 2024/170187 A1 | 8/2024 |
| WO | 2024/232534 A1 | 11/2024 |
| WO | 2025/030458 A1 | 2/2025 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.6.0, Sep. 2023, pp. 1-1337.

"3rd Generation Partnership Project; Technical Specification Group Radio Access Network; NR; Physical layer procedures for data (Release 18)", 3GPP TS 38.214, V18.0.0, Sep. 2023, p. 1-278.

"3rd Generation Partnership Project; Technical Specification Group Radio Access Network; NR; Multiplexing and channel coding (Release 18)", 3GPP TS 38.212, V18.0.0, Sep. 2023, pp. 1-278.

"MAC CE for SP CSI reporting on PUCCH", 3GPP TSG-RAN WG2 Meeting #123bis, R2-2310793, Agenda: 7.3.1, Nokia, Oct. 9-13, 2023, 4 pages.

"Triggering MAC CE for L1/L2-triggered Mobility", 3GPP TSG-RAN WG2 Meeting #121, R2-2300278, Agenda: 8.4.2.3, MediaTek Inc, Feb. 27-Mar. 3, 2023, pp. 1-5.

"3rd Generation Partnership Project; Technical Specification Group Radio Access Network; NR; Medium Access Control (MAC) protocol specification (Release 17)", 3GPP TS 38.321, V17.6.0, Sep. 2023, pp. 1-253.

International Search Report and Written Opinion received for corresponding Patent Cooperation Treaty Application No. PCT/EP2024/080376, dated Feb. 4, 2025, 11 pages.

"Layer-1 Enhancements for L1/L2-triggered Mobility", 3GPP TSG RAN WG1 #112, R1-2300384, Agenda: 9.12.1, Nokia, Feb. 27-Mar. 3, 2023, 19 pages.

"Remaining details on LI enhancements for inter-cell beam manageme", 3GPP TSG RAN WG1 #114bis, R1-2309383, Agenda: 8.7.1, Samsung, Oct. 9-13, 2023, 10 pages.

CATT, Discussion on L1 related issues for LTM, 3GPP TSG-RAN WG2 Meeting #123bis, R2-2309916, (Oct. 9-13, 2023), 12 pages.

Ericsson, "L1 measurements aspects for LTM", 3GPP TSG-RAN WG2 Meeting #122, R2-2306012, (May 22-26, 2023), 8 pages.

Ericsson, "RRC running CR for LTM", 3GPP TSG-RAN WG2 Meeting #123-bis, Draft Change Request, R2-230xxxx, (Oct. 9-13, 2023), 114 pages.

Google, "Discussion on L1 enhancements for inter-cell beam management", 3GPP TSG RAN WG1 #114bis, R1-2309786, (Oct. 9-13, 2023), 10 pages.

Huawei et al., "38.321 running CR for introduction of NR further mobility enhancements", 3GPP TSG-RAN WG2 Meeting #123bis, R2-2309869, (Oct. 9-13, 2023), 249 pages.

Huawei et al., "38.321 running CR for introduction of NR further mobility enhancements", 3GPP TSG-RAN WG2 Meeting #123bis, R2-2311595, (Oct. 9-13, 2023), 251 pages.

Huawei et al., "38.321 running CR for introduction of NR further mobility enhancements", 3GPP TSG-RAN2 Meeting #123, R2-2309281, (Aug. 21-25, 2023), 249 pages.

IEEE, "802.16e-2005—IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands", IEEE Std 802.16e-2005, (Feb. 28, 2006), 864 pages.

Lenovo, "Discussion on L1 enhancements for inter-cell beam management", 3GPP TSG RAN WG1 #113, R1-2304957, (May 22-26, 2023), 10 pages.

Lenovo, "Remaining issues of L1 enhancements for inter-cell beam management", 3GPP TSG RAN WG1 #114bis, R1-2309322, (Oct. 9-13, 2023), 7 pages.

Nokia et al., "Remaining Issues on Layer-1 Enhancements for L1/L2-triggered Mobility", 3GPP TSG RAN WG1 #114-bis, R1-2309733, (Oct. 9-13, 2023), 8 pages.

Qualcomm Incorporated, "RRC aspects of LTM", 3GPP TSG-RAN WG2 Meeting #121bis-e, R2-2302831, (Apr. 17-26, 2023), 9 pages.

Qualcomm Incorporated, "Signalling Support for LTM", 3GPP TSG-RAN WG3 Meeting #121-bis, R3-235264, (Oct. 9-13, 2023), 7 pages.

Transsion Holdings, "Discussion on measurement configuration for LTM", 3GPP TSG-RAN WG2 Meeting #122, R2-2305369, (May 22-26, 2023), 6 pages.

Vivo, "Discussion on L1 enhancements for L1/L2 mobility", 3GPP TSG RAN WG1 #114, R1-2306767, (Aug. 21-25, 2023), 12 pages.

Vivo, "Discussion on L1 enhancements for L1/L2-triggered mobility", 3GPP TSG RAN WG1 #114bis, R1-2309083, (Oct. 9-13, 2023), 7 pages.

Xiaomi, "Discussion on sub-configuration for power adaption and spatial adaption", 3GPP TSG-RAN WG2 Meeting #123bis, R2-2309520, (Oct. 9-13, 2023), 7 pages.

ZTE Corporation, "Remaining issues on LTM RRC", 3GPP TSG-RAN WG2 Meeting #123-bis, R2-2309834, (Oct. 9-13, 2023), 9 pages.

Office Action for Taiwanese Application No. 113141534 dated Nov. 13, 2025, 22 pages.

* cited by examiner

| SL | Serving Cell ID | | | | | BWP ID | | Oct 1 |
|----|---|---|---|---|---|---|---|---|
| R | R | R | R | $S_3$ | $S_2$ | $S_1$ | $S_0$ | Oct 2 |

FIG. 3

| R | Serving Cell ID | | | | | BWP ID | | Oct 1 |
|----|---|---|---|---|---|---|---|---|
| SP | R | R | R | $S_3$ | $S_2$ | $S_1$ | $S_0$ | Oct 2 |

FIG. 4

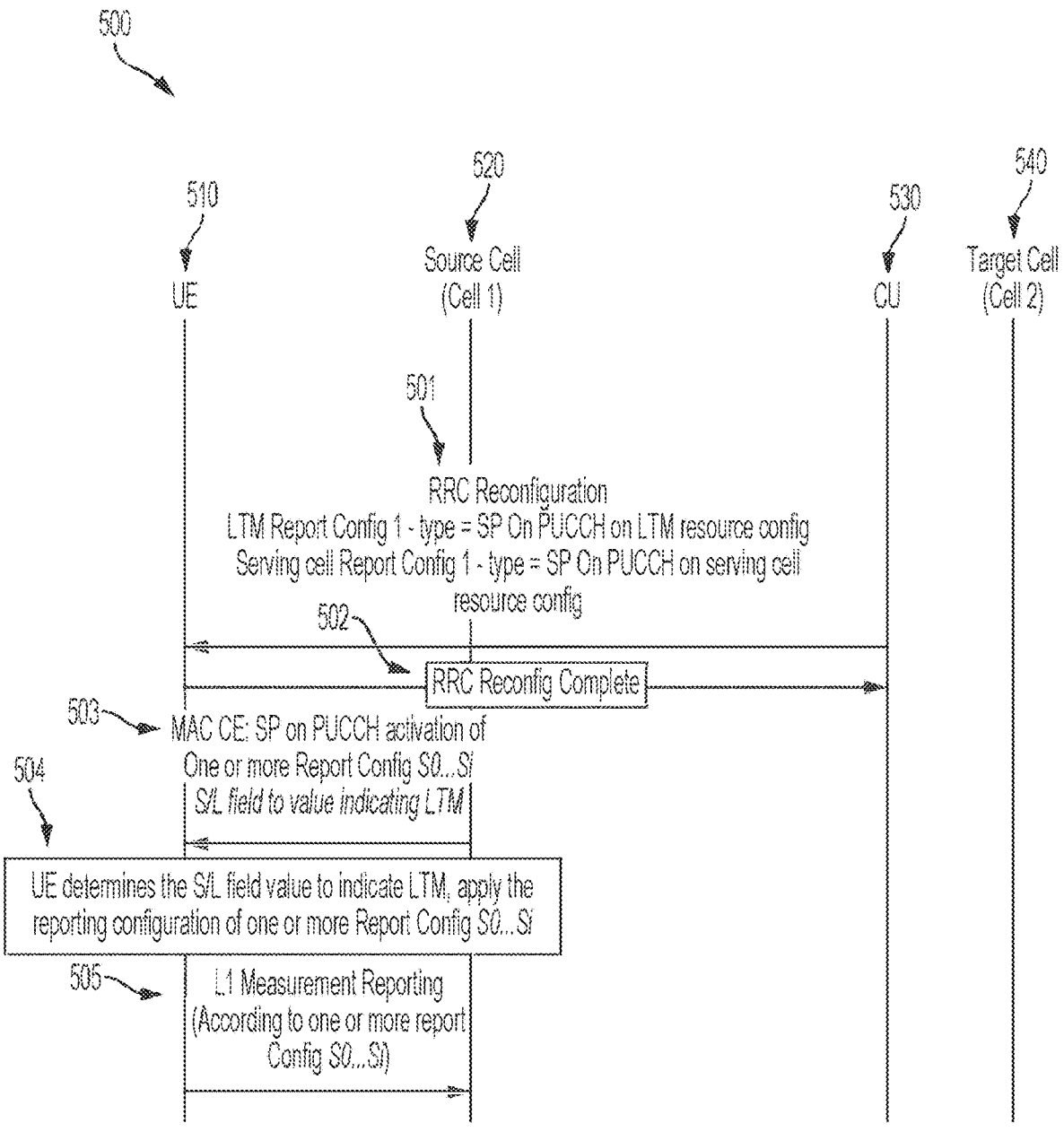

500

510
UE

520
Source Cell
(Cell 1)

530
CU

540
Target Cell
(Cell 2)

501
RRC Reconfiguration
LTM Report Config 1 - type = SP On PUCCH on LTM resource config
Serving cell Report Config 1 - type = SP On PUCCH on serving cell
resource config 502
RRC Reconfig Complete 503 MAC CE: SP on PUCCH activation of
One or more Report Config S0...Si
S/L field to value indicating LTM 504
UE determines the S/L field value to indicate LTM, apply the
reporting configuration of one or more Report Config S0...Si 505 L1 Measurement Reporting
(According to one or more report
Config S0...Si)

FIG. 5

FROM FIG. 6A FROM FIG. 6A

FROM FIG. 6A

FROM FIG. 6A

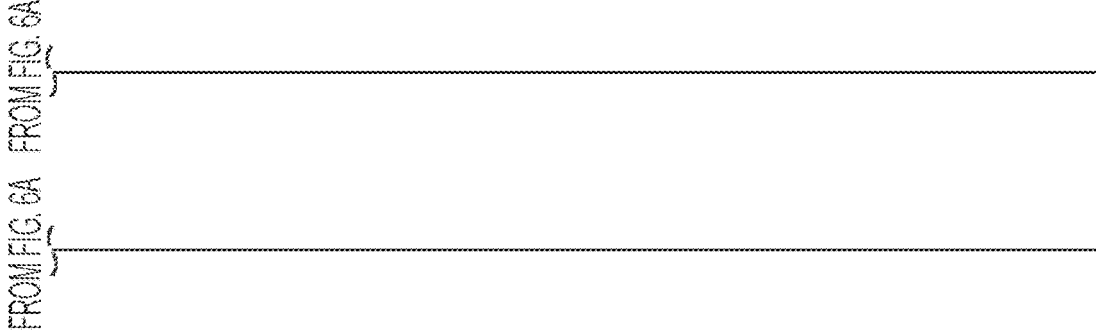

SpCELL == not include

606 — MAC CE: SP on PUCCH activation of Report Config;
S0(LTM report config 1),
S1(LTM report config 2),
*SP field set to value indicating NO SpCell inclusion*

607 — UE determines the SP field value to indicate SpCell inclusion,
the UE applies reporting config S0 NOT including SpCell measurements
the UE applies reporting config S1 NOT including SpCell measurements 608 — L1 Measurements Reporting
According to config S0, S1 not including SpCell measurements

FIG. 6B

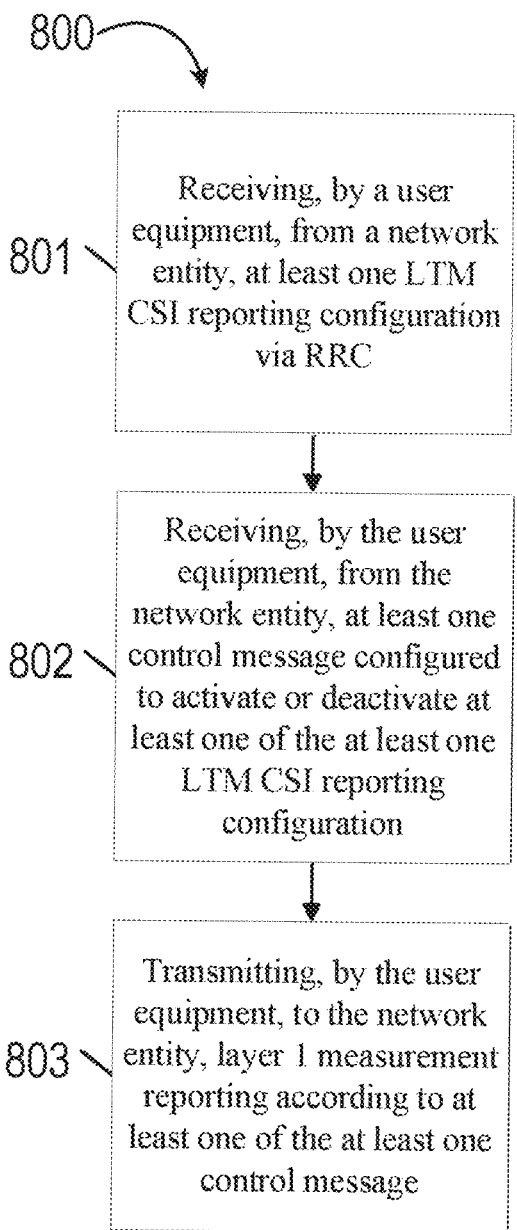

800

801 — Receiving, by a user equipment, from a network entity, at least one LTM CSI reporting configuration via RRC 802 — Receiving, by the user equipment, from the network entity, at least one control message configured to activate or deactivate at least one of the at least one LTM CSI reporting configuration 803 — Transmitting, by the user equipment, to the network entity, layer 1 measurement reporting according to at least one of the at least one control message

Figure 8

METHODS FOR MEASUREMENT REPORTING VIA CHANNEL STATE INFORMATION ACTIVATION OR DEACTIVATION

TECHNICAL FIELD

In 3GPP, layer 1 (L1)/layer 2 (L2) triggered mobility (LTM) is a cell switch procedure, wherein the serving cell (e.g., primary cell (PCell) or primary secondary cell (PS-Cell)) of a UE may be switched by the network by sending an LTM cell switch command. An LTM switch command may be delivered by medium access control (MAC) signaling using a MAC control element (CE). Thus, changing between cells may currently be performed without using radio resource control (RRC) signaling as a L3 based handover. LTM cell switch decisions may be based on measurements (e.g., L1 measurements) that may be performed and reported (e.g., L1 measurement report) by the UE. Measurements and reporting may be based on LTM candidate cell configurations provided by the network for one or more LTM candidate cells. LTM candidate cells may include neighboring cells and/or any current serving cells of the UE (e.g., SCells). Improvements in the LTM procedures and techniques are desired.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (cMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a user equipment, from a network entity, at least one LTM CSI reporting configuration via RRC. The method may further include receiving, by the user equipment, from the network entity, at least one control message configured to activate or deactivate at least one of the at least one LTM CSI reporting configuration. The method may further include transmitting, by the user equipment, to the network entity, L1 measurement reporting according to at least one of the at least one control message.

In accordance with certain example embodiments, an apparatus may include means for receiving, from a network entity, at least one LTM CSI reporting configuration via RRC. The apparatus may further include means for receiving, from the network entity, at least one control message configured to activate or deactivate at least one of the at least one LTM CSI reporting configuration. The apparatus may further include means for transmitting, to the network entity, L1 measurement reporting according to at least one of the at least one control message.

In accordance with various example embodiments, a non-transitory computer readable medium may include program instructions that, when executed by an apparatus, cause the apparatus to perform at least a method. The method may include receiving, from a network entity, at least one LTM CSI reporting configuration via RRC. The method may further include receiving, from the network entity, at least one control message configured to activate or deactivate at least one of the at least one LTM CSI reporting configuration. The method may further include transmitting, to the network entity, L1 measurement reporting according to at least one of the at least one control message.

In accordance with some example embodiments, a computer program product may perform a method. The method may include receiving, from a network entity, at least one LTM CSI reporting configuration via RRC. The method may further include receiving, from the network entity, at least one control message configured to activate or deactivate at least one of the at least one LTM CSI reporting configuration. The method may further include transmitting, to the network entity, L1 measurement reporting according to at least one of the at least one control message.

In accordance with certain example embodiments, an apparatus may include at least one processor and at least one memory storing instructions that, when executed by the at least one processor, cause the apparatus at least to receive, from a network entity, at least one LTM CSI reporting configuration via RRC. The at least one memory and instructions, when executed by the at least one processor, may further cause the apparatus at least to receive, from the network entity, at least one control message configured to activate or deactivate at least one of the at least one LTM CSI reporting configuration. The at least one memory and instructions, when executed by the at least one processor, may further cause the apparatus at least to transmit, to the network entity, L1 measurement reporting according to at least one of the at least one control message.

In accordance with various example embodiments, an apparatus may include receiving circuitry configured to perform receiving, from a network entity, at least one LTM CSI reporting configuration via RRC. The apparatus may further include receiving circuitry configured to perform receiving, from the network entity, at least one control message configured to activate or deactivate at least one of the at least one LTM CSI reporting configuration. The apparatus may further include transmitting circuitry configured to perform transmitting, to the network entity, L1 measurement reporting according to at least one of the at least one control message.

In accordance with some example embodiments, a method may include transmitting, by a network entity, to a user equipment, at least one LTM CSI reporting configuration via RRC. The method may further include transmitting, by the network entity, to the user equipment, at least one control message configured to activate or deactivate at least one of the at least one LTM CSI reporting configuration. The method may further include receiving, by the network entity, from the user equipment, L1 measurement reporting according to at least one of the at least one control message.

In accordance with certain example embodiments, an apparatus may include means for transmitting, to a user equipment, at least one LTM CSI reporting configuration via RRC. The apparatus may further include means for transmitting, to the user equipment, at least one control message configured to activate or deactivate at least one of the at least one LTM CSI reporting configuration. The apparatus may further include means for receiving, from the user equipment, L1 measurement reporting according to at least one of the at least one control message.

In accordance with various example embodiments, a non-transitory computer readable medium may include program instructions that, when executed by an apparatus, cause the apparatus to perform at least a method. The method may include transmitting, to a user equipment, at least one LTM CSI reporting configuration via RRC. The method may further include transmitting, to the user equipment, at least one control message configured to activate or deactivate at least one of the at least one LTM CSI reporting configuration. The method may further include receiving, from the user equipment, L1 measurement reporting according to at least one of the at least one control message.

In accordance with some example embodiments, a computer program product may perform a method. The method may include transmitting, to a user equipment, at least one LTM CSI reporting configuration via RRC. The method may further include transmitting, to the user equipment, at least one control message configured to activate or deactivate at least one of the at least one LTM CSI reporting configuration. The method may further include receiving, from the user equipment, L1 measurement reporting according to at least one of the at least one control message.

In accordance with certain example embodiments, an apparatus may include at least one processor and at least one memory storing instructions that, when executed by the at least one processor, cause the apparatus at least to transmit, to a user equipment, at least one LTM CSI reporting configuration via RRC. The at least one memory and instructions, when executed by the at least one processor, may further cause the apparatus at least to transmit, to the user equipment, at least one control message configured to activate or deactivate at least one of the at least one LTM CSI reporting configuration. The at least one memory and instructions, when executed by the at least one processor, may further cause the apparatus at least to receive, from the user equipment, L1 measurement reporting according to at least one of the at least one control message.

In accordance with various example embodiments, an apparatus may include transmitting circuitry configured to perform transmitting, to a user equipment, at least one LTM CSI reporting configuration via RRC. The apparatus may further include transmitting circuitry configured to perform transmitting, to the user equipment, at least one control message configured to activate or deactivate at least one of the at least one LTM CSI reporting configuration. The apparatus may further include receiving circuitry configured to perform receiving, from the user equipment, L1 measurement reporting according to at least one of the at least one control message.

BRIEF DESCRIPTION OF THE DRAWINGS

For a proper understanding of example embodiments, reference should be made to the accompanying drawings, wherein:

FIG. 3 illustrates an example of activation/deactivation MAC CE command for SP CSI reporting on PUCCH;

FIG. 4 illustrates an example of activation/deactivation MAC CE command for SP LTM CSI reporting on PUCCH with a bit to toggle SpCellInclusion;

FIG. 5 illustrates an example of a signaling diagram according to certain example embodiments;

FIGS. 6A-6B illustrates an example of another signaling diagram according to some example embodiments;

FIG. 8 illustrates an example of a flow diagram of a method according to various example embodiments;

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for supporting aperiodic, periodic and SP reporting on PUCCH/PUSCH or using a MAC CE is not intended to limit the scope of certain example embodiments, but is instead representative of selected example embodiments.

In 3GPP, LTM is a cell switch procedure, wherein the serving cell (e.g., primary cell (PCell) or primary secondary cell (PSCell)) of a UE may be switched by the network by sending an LTM cell switch command. An LTM switch command may be delivered by MAC signaling using a MAC CE. Thus, changing between cells may currently be performed without using RRC signaling as a L3 based handover. LTM cell switch decisions may be based on measurements (e.g., L1 measurements) that may be performed and reported (e.g., L1 measurement report) by the UE. Measurements and reporting may be based on LTM candidate cell configurations provided by the network for one or more LTM candidate cells. LTM candidate cells may include neighboring cells and/or any current serving cells of the UE (e.g., SCells).

Before the cell switch, a network may optionally activate one or more transmission configuration indicator (TCI) states for one or more candidate cells. Once a candidate cell TCI state is activated, the UE may track the timing of the activated TCI states. The UE may also perform early uplink (UL) synchronization before the cell switch (if requested by the network).

Figures 1, 2:
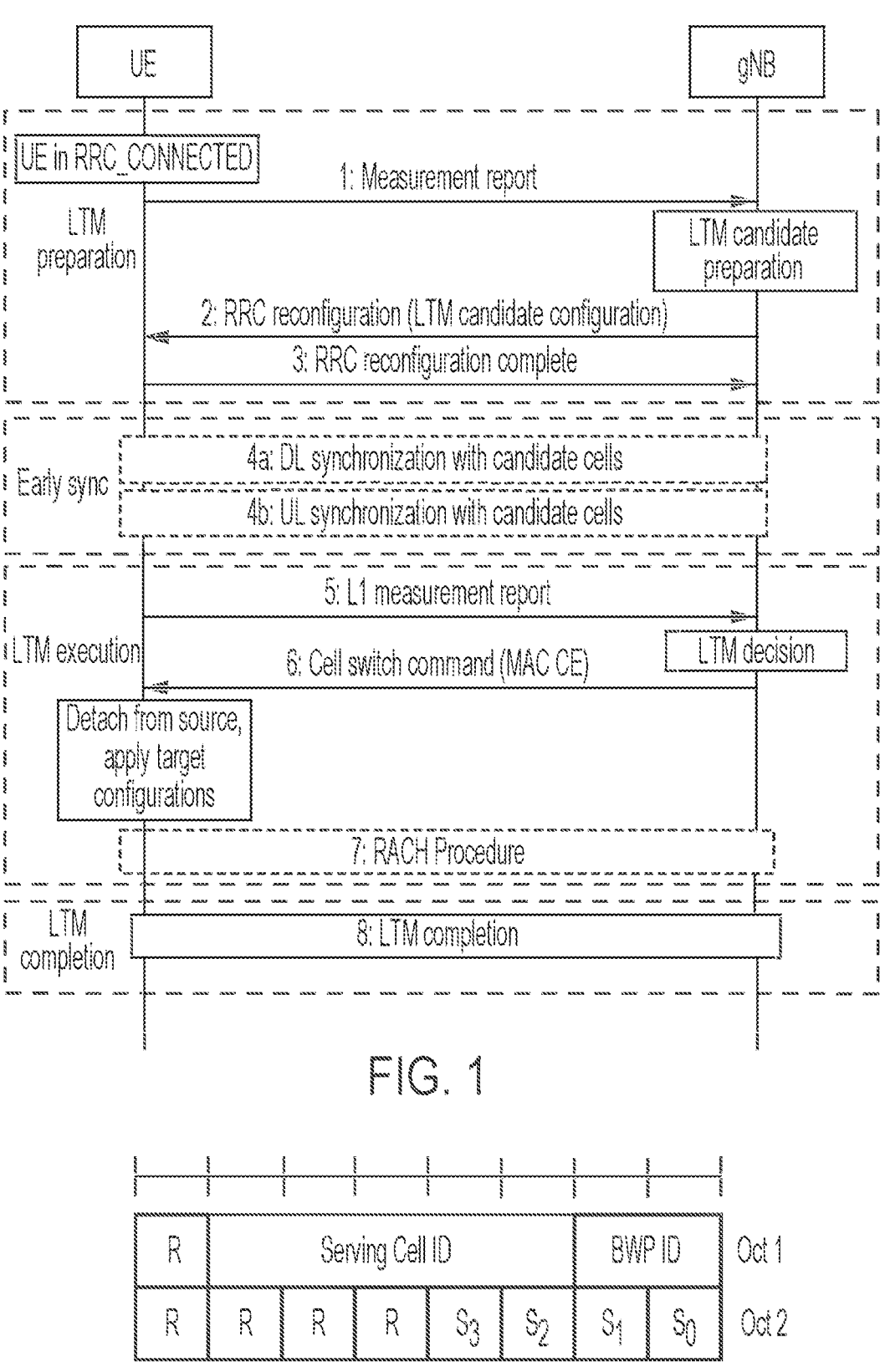
FIG. 1 illustrates an example of a signaling diagram.
FIG. 2 illustrates an example of a SP reporting on PUCCH activation/deactivation MAC CE.

FIG. 1 depicts an example LTM procedure. At step 1, the UE may transmit a MeasurementReport message to the gNB (i.e., base station). The gNB may determine to configure LTM and initiate candidate cells preparation. At step 2, the gNB may transmit an RRCReconfiguration message to the UE, including the LTM candidate cell configurations of at least one candidate cell. At step 3, the UE may store the LTM candidate cell configurations, and transmit an RRCRecon-figurationComplete message to the gNB.

At step 4a, the UE may perform DL synchronization with candidate cells before receiving the cell switch command. At step 4b, the UE may perform early timing advance (TA) acquisition with candidate cells requested by the network before receiving the cell switch command. For example, this may be performed via contention free random access (CFRA) triggered by a physical downlink control channel (PDCCH) order from the source cell. The UE may then transmit a preamble towards the indicated candidate cell. In order to minimize the data interruption of the source cell due to CFRA towards the candidate cells, the UE may not receive a random access response (RAR) for the purpose of TA value acquisition. The TA value of the candidate cell may be indicated in the cell switch command. The UE may not maintain the TA timer for the candidate cell, and may instead rely on network implementation to guarantee the TA valid-ity.

At step 5, the UE may perform L1 measurements on the configured candidate cells, and may transmit lower-layer measurement reports to the gNB. Measurements, such as L1 measurements, may be performed according to the RRC reconfiguration at step 2. At step 6, the gNB may determine to execute cell switch to a target cell, and may transmit a MAC CE triggering cell switch by including the candidate configuration index of the target cell. The UE may switch to the target cell and apply the configuration indicated by candidate configuration index.

At step 7, if UE does not have valid TA of the target cell, the UE may perform the random access procedure towards the target cell.

At step 8, the UE may complete the LTM cell switch procedure (e.g., by sending RRCReconfigurationComplete message to target cell). If the UE has performed a RA procedure in step 7, the UE may consider that LTM execu-tion is successfully completed when the random access procedure is successfully completed. For LTM without random access channel (RACH), the UE may consider that LTM execution is successfully completed when the UE determines that the network has successfully received its first UL data. The UE may determine successful reception of its first UL data by receiving a PDCCH addressing the UE's cell-radio network temporary identifier (C-RNTI) in the target cell, which may schedule a new transmission follow-ing the first UL data. It is noted that steps 4-8 may be performed multiple times for subsequent LTM cell switch using the LTM candidate cell configurations provided at step 2.

In LTM, the UE may perform a MAC reset. Using RRC signalling, the network may control whether the UE per-forms radio link control (RLC) re-establishment and packet data convergence protocol (PDCP) data recovery during cell switching. The PDCP data recovery procedure may be applied to the RLC acknowledge mode (AM) data radio bearers (DRBs) for inter-distributed unit (DU) LTM cell switch.

For LTM, information about measurement resources (e.g., synchronization signal block (SSB) or CSI-RS) from LTM candidate cells may be provided to the UE so that the UE can make measurements. The UE may also be configured with L1 measurement reporting configuration where the UE can report the measurements. For LTM, periodic and SP report on PUCCH, SP reporting on physical uplink shared channel (PUSCH), and aperiodic report on PUSCH may be sup-ported.

Each reporting setting (e.g., LTM-CSI-ReportConfig) may be associated with a LTM resource configuration for channel measurement, and may contain the parameters for time-domain behavior provided by ltm-ReportConfigType (i.e., periodic, SP report on PUCCH, SP report on PUSCH, aperiodic report on PUSCH), the number of candidate cells and the number of reference signals per candidate cell provided by noOfReportedCells, and noOfReportedRS-Per-Cell, respectively, including L1 measurement results asso-ciated with current special cell (SpCell) if spCellInclusion is configured.

The time domain behavior of an LTM-CSI-ReportConfig may be indicated by the higher layer parameter ltm-Report-ConfigType, and may be set to 'aperiodic', 'semiPersisten-tOnPUCCH', 'semiPersistentOnPUSCH', or 'periodic.' For 'periodic' and 'semiPersistentOnPUCCH'/'semiPersisten-tOnPUSCH' CSI reporting, the configured periodicity and slot offset may apply in the numerology of the UL bandwidth part (BWP) in which the CSI report is configured to be transmitted on.

A set of LTM CSI report configurations containing one or more CSI reporting configurations (e.g., LTM-CSI-Report-Configs), separately from the legacy CSI reporting configu-ration (i.e., used for serving cell beam management and CSI acquisition), may be configured. Each of the CSI reporting configurations (i.e., LTM and legacy) may have its own identifier (ID) space (e.g., report configuration identity), running from 0 to a predetermined number. As an example, legacy CSI reporting may refer to CSI reporting (serving cell CSI reporting).

The UE may be configured with one or more CSI report-ing configurations, where each reporting configuration may include a LTM CSI resource configuration containing the information of resources to be used for channel measure-ments (e.g., L1-reference signal receive power (RSRP) measurements). A LTM resource configuration may contain SSBs from one or more candidate cells. For each reporting configuration, the UE may be configured to report M beams from each of the L configured candidate cells (i.e., each LTM CSI Resource Setting (LTM-CSI-ResourceConfig) may con-tain configuration of a LTM-CSI-SSB-ResourceSet which includes a list of Z≥1 synchronization signal (SS)/physical broadcast channel (PBCH) blocks indices (given by ltm-CSI-SSB-ResourceList) and a list of Z LTM-CandidateIds (given by ltm-CandidateIDList) referring to candidate cells associated with the SS/PBCH block indices). For each candidate cell, the UE may determine the time domain behavior of a SS/PBCH block resource from ssb-Periodicity and ssb-PositionsInBurst. The frequency domain behavior of a SS/PBCH block resource may be determined by the higher layer parameters subCarrierSpacing, ssbFrequency.

If a UE is configured with an LTM-CSI-ReportConfig, and if the UE is configured with spCellInclusion, the UE may report in a single reporting instance noOfReportedRS-PerCell different SSBRI for the current SpCell, and each of the noOfReportedCells −1 candidate cells. Otherwise, the UE may report in a single reporting instance noOfReport-edRS-PerCell different SS/PBCH block resource indicator (SSBRI) for each of the noOfReportedCell candidate cells, wherein SSBRI k (k≥0) corresponds to the configured (k+1)-th entry of the associated ltm-CSI-SSB-ResourceList in the corresponding LTM-CSI-SSB-ResourceSet.

If spCellInclusion is configured, SSB resources in ltm-CSI-SSB-ResourceList associated with the current SpCell may be the entries where physical cell identity (PCI) and frequency information (e.g., given by SSB frequency) of the associated candidate cell (given in ltm-CandidateIdList) is equal to the PCI and frequency information (given by SSB frequency) of the current SpCell.

For gNB scheduled L1 measurement reporting for Rel-18, LTM may support reporting as UCI; similarly, SP reporting may be supported on PUSCH, and aperiodic reporting may be supported on PUSCH. In a single report instance, reports for serving cells and candidate cells for intra-frequency and/or inter-frequency may be included.

For beam selection for SSB based L1-RSRP measurement reports, beam selection may be performed across the L cells from configured (or activated, if introduced) cells (i.e., M beams for each of the L cells). M×L beams may be reported in a single report instance. Maximum values of M and L may be based on UE capability, and at least M×L=4 may be supported as a UE capability. The values of M and L may be configured in the UE in the reporting configuration. In addition, periodic and SP reporting on PUCCH may be supported for gNB scheduled L1-measurement reporting. For the beam selection for SSB based L1-RSRP measurement report, the inclusion of current SpCell in the L1 measurement report may be configurable.

For beam selection for SSB based L1-RSRP measurement report, for the value of M, L, the RRC configured candidate values may be M=1, 2, 3, 4, and L=1, 2, 3, 4. The UE capability may determine the maximum values of M*L and combination of M and L.

Absolute values and differential values may be used for L1-RSRP reporting. For absolute L1-RSRP, the L1-RSRP value may quantized to a 7-bit value in the range [−140, −44] decibel-milliwatts (dBm) with 1 decibel (dB) step size. For differential L1-RSRP, the L1-RSRP value may be quantized to a 4-bit value, where the differential L1-RSRP value may be computed with 2 dB step size from a reference L1-RSRP value.

SSBRI among configured candidate cells may be included for each L1-RSRP report. The bit size of SSBRI may be $$\lceil \log_2(K_s^{SSB}) \rceil,$$

where $$K_s^{SSB}$$

is the number of configured SSBs in the corresponding resource set for the report. The following format may be used for reporting:

| CSI report number | CSI fields |
|---|---|
| CSI report #n | SSBRI #1, if reported |
| | SSBRI #2, if reported |
| | . |
| | . |
| | . |
| | SSBRI #L*M, if reported |
| | RSRP #1, if reported |
| | Differential RSRP #2, if reported |
| | . |
| | . |
| | . |
| | Differential RSRP #L*M, if reported |

Information element (IE) LTM-CSI-ReportConfig may be used to configure reports on the cell in which the LTM-CSI-ReportConfig is included. IE LTM-CSI-ReportConfig may be configured as follows:

```
-- ASN1START
-- TAG-LTM-CSI-REPORTCONFIG-START
LTM-CSI-ReportConfig-r18 ::=                    SEQUENCE {
    ltm-CSI-ReportConfigId-r18                      LTM-CSI-ReportConfigId-r18
    ltm-ResourcesForChannelMeasurement-r18                  LTM-CSI-ResourceConfigId-
r18
    ltm-ReportConfigType-r18                            CHOICE {
        periodic-r18                            SEQUENCE {
            reportSlotConfig-r18                        CSI-ReportPeriodicityAndOffset,
            pucch-CSI-ResourceList-r18                      SEQUENCE (SIZE
(1..maxNrofBWPs)) OF PUCCH-CSI-Resource
        },
        semiPersistentOnPUCCH-r18                           SEQUENCE {
            reportSlotConfig-r18                        CSI-ReportPeriodicityAndOffset,
            pucch-CSI-ResourceList-r18                      SEQUENCE (SIZE
(1..maxNrofBWPs)) OF PUCCH-CSI-Resource
        },
    },
    ltm-ReportContent-r18                       LTM-ReportContent-r18

...
}
LTM-ReportContent-r18 ::= SEQUENCE {
    noOfReportedCells-r18                           ENUMERATED {n1,n2,n3,n4}
    noOfReportedRS-PerCell-r18                          ENUMERATED {n1,n2,n3,n4}
    spCellInclusion-r18                     ENUMERATED {true}
OPTIONAL, -- Need R
}
-- TAG-LTM-CSI-REPORTCONFIG-STOP
-- ASN1STOP
```

LTM-CSI-ReportConfig may also include the following field descriptions:

| LTM-CSI-ReportConfig field descriptions |
| --- |
| ltm-CSI-ReportConfigId<br>This field is used to identify an LTM-CSI-ReportConfig.<br>ltm-ReportContent<br>This field defines the content of the LTM L1 measurement report.<br>ltm-ResourcesForChannelMeasurement<br>This field indicates the resources used for LTM L1 measurements.<br>pucch-CSI-ResourceList<br>Indicates which PUCCH resource to use for reporting on PUCCH.<br>reportConfigType<br>This field describes the time domain behaviour of how the L1 measurements are reported.<br>reportSlotConfig<br>Periodicity and slot offset (see TS 38.214 [19], clause 5.2.1.4). |

| LTM-ReportContent field descriptions |
| --- |
| noOfReportedCells<br>This field defines how many cells are reported within a single L1 measurement report instance.<br>noOfReportedRS-PerCell<br>This field defines how many RSs per cell are reported within a single L1 measurement report instance.<br>spCellInclusion<br>This field indicates whether the UE shall include a L1 measurement report associated to the current SpCell. This field can only be configured if the current SpCell is configured as an LTM candidate cell. |

The IE LTM-CSI-ResourceConfig may define a group of one or more CSI resources for an LTM candidate cell configuration. IE LTM-CSI-ResourceConfig may be configured as follows:

```
-- ASN1START
-- TAG-LTM-CSI-RESOURCECONFIG-START
LTM-CSI-ResourceConfig-r18 ::=        SEQUENCE {
    ltm-CSI-ResourceConfigId-r18              LTM-CSI-ResourceConfigId-r18,
    ltm-CSI-SSB-ResourceSet-r18               LTM-CSI-SSB-ResourceSet-r18,
    ...
}
LTM-CSI-SSB-ResourceSet-r18 ::=       SEQUENCE {
    ltm-CSI-SSB-ResourceSetId-r18              LTM-CSI-SSB-ResourceSetId-r18,
    ltm-CSI-SSB-ResourceList-r18               SEQUENCE (SIZE
(1..maxNrofLtmCSI-SSB-ResourcesPerSet-r18)) OF SSB-Index,
    ltm-CandidateIdList-r18             SEQUENCE (SIZE (1..maxNrofLtmCSI-
SSB-ResourcesPerSet-r18)) OF LTM-CandidateId-r18
}
-- TAG-LTM-CSI-RESOURCECONFIG-STOP
-- ASN1STOP
```

IE LTM-CSI-ResourceConfig may also include the following field descriptions:

| LTM-CSI-ResourceConfig field descriptions |
| --- |
| ltm-CSI-ResourceConfigId<br>This field is used to identify an instance of LTM-CSI-ResourceConfig IE.<br>ltm-CSI-SSB-ResourceSet<br>This field defines one SS/PBCH block resource set from one or more LTM candidate cells. |

| LTM-CSI-SSB-ResourceSet field descriptions |
| --- |
| ltm-CandidateIdList<br>This field Indicates the LTM candidate cell IDs related to the SSBs in the ltm-CSI-SSB-ResourceList. The list has the same number of entries as ltm-CSI-SSB-ResourceList.<br>ltm-CSI-SSB-ResourceList |

-continued

| |
| --- |
| This field is used to indicate on SS/PBCH block resources from one or more LTM candidate cells.<br>ltm-CSI-SSB-ResourceSetId<br>This field is used to idenfity on SS/PBCH block resource set. |

For SP reporting on PUCCH, the PUCCH resource used for transmitting the CSI report may be configured by report-ConfigType. SP reporting on PUCCH may be activated by an activation command, which may select one of the SP reporting settings for use by the UE on the PUCCH. When the UE would transmit a PUCCH with hybrid automatic repeat request (HARQ)-acknowledgement (ACK) information in slot n corresponding to the physical data shared channel (PDSCH) carrying the activation command, the indicated SP reporting setting may be applied starting from the first slot that is after $$\text{slot } n + 3N_{slot}^{subframe,\mu},$$

where μ is the subcarrier spacing (SCS) configuration for the PUCCH.

A UE may perform SP CSI reporting on the PUCCH applied starting from the first slot that is after slot n+3Nslot-subframe,μ when the UE would transmit a PUCCH with HARQ-ACK information in slot n corresponding to the PDSCH carrying the activation command, where u is the SCS configuration for the PUCCH. The activation command will contain one or more reporting settings where the associated CSI resource settings are configured.

FIG. 2 illustrates an example of a SP CSI reporting on PUCCH activation/deactivation MAC CE. The SP CSI reporting on PUCCH activation/deactivation MAC CE may be identified by a MAC subheader with logical channel ID (LCID) of value 25. It may have a fixed size of 16 bits, and include several fields, such as serving cell ID: this field may indicate the identity of the serving cell for which the MAC CE applies; the length of the field may be 5 bits. The MAC subheader may also include a BWP ID field indicating a UL BWP for which the MAC CE applies as the codepoint of the DCI bandwidth part indicator field; the length of the BWP ID field may be 2 bits. The MAC subheader may also include a $S_i$ field indicating the activation/deactivation status of the SP CSI report configuration within csi-ReportCon-figToAddModList. $S_0$ refers to the report configuration which may include PUCCH resources for SP CSI reporting in the indicated BWP, and may have the lowest CSI- ReportConfigId within the list with type set to semiPersistentOnPUCCH, $S_1$ to the report configuration which includes PUCCH resources for SP CSI reporting in the indicated BWP and has the second lowest CSI-ReportConfigId, and so on. If the number of report configurations within the list with type set to semiPersistentOnPUCCH in the indicated BWP is less than i+1, MAC entity may ignore the $S_i$ field. The $S_i$ field may be set to 1 to indicate that the corresponding SP CSI report configuration may be activated. The $S_i$ field may be set to 0 to indicate that the corresponding SP CSI report configuration i shall be deactivated. The MAC subheader may also include a reserved bit R set to 0.

For LTM, a set of LTM CSI report configurations, separately from legacy CSI report configurations used for intra/inter-cell beam management and serving cell CSI acquisition (i.e., legacy CSI reporting for serving cell herein), may support Rel-18 LTM. LTM CSI reporting configurations and legacy CSI report configurations may have their own (i.e., independent) configuration identifier spaces to indicate corresponding report configurations (i.e., LTM-CSI-ReportConfigId used to uniquely represent a LTM CSI report configuration has values from 0 to a max value (M1=max number of LTM CSI Report Configurations) and CSI-ReportConfigId used to uniquely represent a legacy CSI report configuration has values from 0 to a max value (M2=max number of CSI Report Configurations).

Semi-persistent reporting on PUCCH may be supported for both LTM and serving cell (e.g., legacy or beam management) CSI reporting. For the serving cell semi-persistent reporting on PUCCH, a MAC-CE may be used for activation/deactivation of a semi-persistent reporting on PUCCH by indicating CSI report Config ID or IDs to be activated or/and deactivated. If the same MAC-CE command is used for LTM semi-persistent reporting on PUCCH, the UE may be unable to determine that the given MAC-CE is the serving cell (i.e., legacy) CSI reporting or for LTM CSI reporting. In various example embodiments, legacy CSI reporting may refer to CSI reporting (e.g., serving cell CSI reporting).

The reporting configuration for a LTM report (e.g., including the configuration of SpCellInclusion indicating whether current SpCell measurements to be included in the report or not, and the associated resource configuration which includes the resource signal information of one or more candidate cells to be considered for measurement and reporting) is provided in the RRC configuration. Moreover, there may be a limited number of RRC configured report configurations for dynamically activated/triggered LTM reporting (SP reporting on PUCCH (e.g., up to 4), SP reporting on PUSCH, aperiodic reporting). As the UE moves, there may be a need to update the configuration of a RRC configured reporting configuration. With a limited number of RRC configured report configurations, any update may require an RRC reconfiguration, which is a slower process.

Certain example embodiments described herein may have various benefits and/or advantages to overcome the disadvantages described above. For example, certain example embodiments may provide solutions for the UE to determine whether a given MAC-CE used for SP CSI reporting on PUCCH (or PUSCH) activation/deactivation is for the serving cell CSI reporting or for LTM CSI reporting. Also, some example embodiments may dynamically update the reporting configuration for a CSI report configuration for LTM. Thus, certain example embodiments discussed below are directed to improvements in computer-related technology.

Certain example embodiments may provide a signaling method to indicate to the UE whether the activation/deactivation of one or more SP reporting on PUCCH configurations applies for LTM reporting configuration or serving cell reporting configurations (e.g., legacy reporting used for serving cell CSI). Some example embodiments may also provide a signaling method to dynamically update the reporting configuration for a LTM CSI reporting (i.e., configuration for including the current serving cell (e.g., SpCell) measurements in each report, for one or more LTM CSI reporting configurations being activated/triggered). In addition, various example embodiments may provide a method for determining whether to perform or not perform reporting on one or more SP reporting configurations for legacy serving cell BM/CSI when one or more LTM SP reporting on PUCCH is activated or deactivated. In various example embodiments, the CSI reporting may include reporting one or more of channel quality indicator (CQI), precoding matrix indicator (PMI), CSI-RS resource indicator (CRI), SS/PBCH block resource indicator (SSBRI), layer indicator (L1), rank indicator (RI), L1-RSRP, L1-SINR signal-to-interference-plus-noise ratio, or CapabilityIndex.

Figure 10:
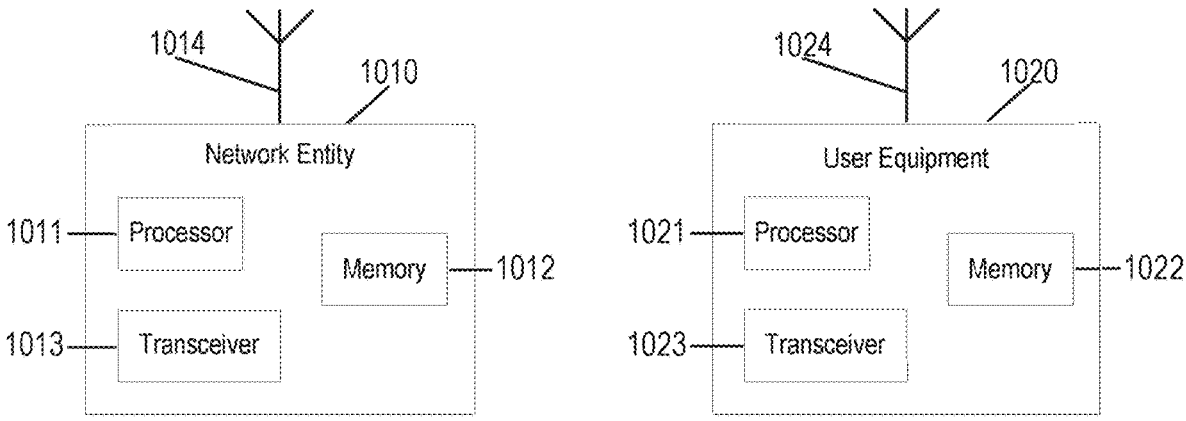
FIG. 10 illustrates an example of various network devices according to some example embodiments.

FIG. 5 illustrates an example of a signaling diagram 500 for activation/deactivation MAC CE with a serving cell/LTM (S/L) field. UE 510 may be similar to UE 1020, and source cell 520, CU 530, and target cell 540 may be similar to NE 1010, as illustrated in FIG. 10, according to certain example embodiments. S/L or an S/L field may refer to serving cell CSI reporting/LTM CSI reporting.

At operation 501, CU 530 may transmit to UE 510 an RRC reconfiguration message.

At operation 502, UE 510 may transmit to CU 530 a RRC reconfiguration complete message.

At operation 503, source cell 520 may transmit to UE 510 a MAC CE SP on PUCCH activation of one or more one or more reporting configurations $S_0 \ldots S_i$, wherein an S/L field may be set to a value indicating LTM. Alternatively, the S/L field (or a field in a downlink control message such as MAC CE) may be set to a value indicating serving cell CSI reporting.

In various example embodiments, SP reporting, PUCCH and/or PUSCH CSI reporting (i.e., PUCCH and PUSCH may be used interchangeably) may be used. Alternatively, SP reporting may be used for MAC CE CSI reporting.

In any of the examples herein, the CSI reporting herein may refer to any time type such as semi persistent, periodic or aperiodic.

In certain example embodiments, the signaling of SP reporting (i.e., activation and/or deactivation of reporting configurations) on PUCCH for LTM may be conveyed in a MAC CE, wherein a field in a MAC CE indicates whether the activation/deactivation of one or more SP reporting configuration applies for LTM reporting configuration or serving cell reporting configuration (e.g., legacy reporting used for serving cell beam management (BM) and CSI). For example, an identifier may be used to uniquely identify the activation/deactivation MAC-CE command for SP LTM CSI reporting on PUCCH. A unique logical channel ID (LCID) and/or a unique extended LCID (ELCID) may be used in MAC subheader to uniquely indicate that this MAC CE is for activation/deactivation of SP LTM CSI reporting on PUCCH. For example, a LCID value different than the LCID used for legacy SP CSI reporting on PUCCH may indicate that this MAC CE is for the LTM CSI reporting. Thus, the UE may read the (c) LCID field of the MAC CE to determine whether the activation or deactivation of reporting configurations (or any other information provided by the MAC CE) is for serving cell CSI reporting or for LTM CSI reporting.

Alternatively, a field in a downlink control message (e.g., DCI/MAC CE), such as the bit field shown in FIG. 3, may be used (e.g., S/L) to differentiate whether the MAC CE is for the legacy SP CSI reporting or the LTM SP CSI reporting. If the field indicates the S (or indicates a first value or a value that indicates serving cell beam management), the activation/deactivation may be for serving cell beam management (e.g., for intra/inter-cell beam management or/and CSI acquisition). Alternatively, if the field indicates L (or indicates a second value or a value that indicates LTM), the activation/deactivation may be for the LTM CSI reporting. S may be represented by 0 (e.g., first value), and L may be represented by '1' (e.g., second value), or vice versa. A field in a downlink control message (e.g., DCI or MAC CE message) may include a field indicating whether information provided by the control message (e.g., DCI or MAC CE) is for the legacy CSI reporting or the LTM CSI reporting.

At operation 504, UE 510 may determine the S/L field value indicates LTM, and may apply the reporting configuration to the one or more reporting configurations $S_0 \ldots S_i$.

In certain example embodiments, when UE 510 determines that the given MAC-CE is an activation/deactivation MAC-CE command for (SP) LTM CSI reporting on PUCCH, UE 510 may determine that the $S_i$ field indicates the activation/deactivation status of the SP CSI report configuration within RRC configured reporting configuration list for LTM (e.g., ltm-csi-ReportConfigToAddModList). So may refer to the report configuration, which may include PUCCH resources for SP CSI reporting in the indicated BWP, and may have the lowest reporting configuration identifier (LTM-CSI-ReportConfigId within the list with type set to semiPersistentOnPUCCH), $S_1$ set to the report configuration which includes PUCCH resources for SP CSI reporting in the indicated BWP and has the second lowest reporting configuration identifier (LTM-CSI-ReportConfigId), and so on. If the number of report configurations within the list (with type set to semiPersistentOnPUCCH) in the indicated BWP is less than i+1, the MAC entity may ignore the $S_i$ field. A $S_i$ field set to 1 may indicate that the corresponding SP CSI report configuration may be activated. The $S_i$ field is set to 0 to indicate that the corresponding SP CSI report configuration i may be deactivated.

At operation 505, UE 510 may transmit (L1) measurement reporting to source (serving cell) cell 520, which may be according to the one or more reporting configurations $S_0 \ldots S_i$.

Figure 6A:
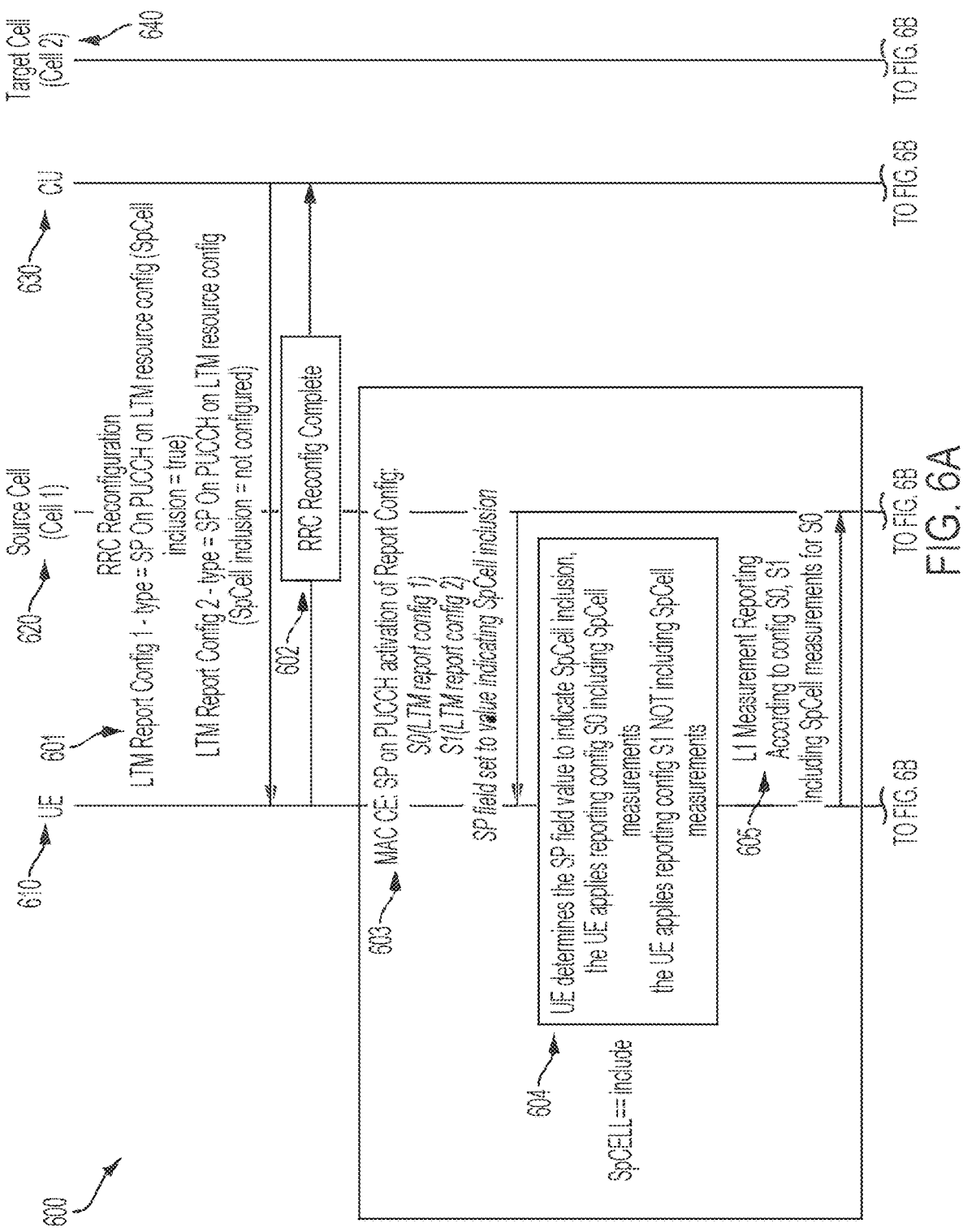

FIGS. 6A-6B illustrates an example of a signaling diagram 600 for SP cell inclusion (activation/deactivation MAC CE with SP). UE 610 may be similar to UE 1020, and source cell 620, CU 630, and target cell 640 may be similar to NE 1010, as illustrated in FIG. 10, according to certain example embodiments.

At operation 601, CU 630 may transmit to UE 610 an RRC reconfiguration message.

At operation 602, UE 610 may transmit to CU 630 an RRC reconfiguration complete message.

Certain example embodiments may include signaling configured to control the inclusion of SpCells measurements and/or reporting of SpCell measurements in the reporting configuration or configurations. In some example embodiments, the signaling (i.e., control message) that activates/deactivates, triggers, and/or updates LTM CSI reporting may further include indications configured to (dynamically) control/change the reporting configuration (i.e., control/change the reported information) for the reports being activated/ triggered. In some example embodiments, this indication may indicate whether or not to include SpCell measurements for one or more activated CSI reporting configurations. In various example embodiments, the inclusion or controlling the inclusion of SpCell measurements or SpCell information in the reporting configuration may be indicated by a field in a downlink control message. For example, this field may be present in a MAC CE or in a DCI message. For example, at operation 603, source cell 620 may transmit to UE 610 a MAC CE for SP on PUCCH activation for reporting configurations. For example, $S_0$ may be related to a first LTM reporting configuration, while $S_1$ may be related to a second LTM reporting configuration. An SP field may be set to a value indicating SpCellInclusion. At operation 604, UE 610 may determine an SP field value to indicate SpCellInclusion, and may apply reporting configuration $S_0$ including SpCell measurements. Alternatively, UE 610 may apply reporting configuration $S_0$ without SpCell measurements (e.g., if an SP field is included). At operation 605, UE 610 may transmit to source cell 620 L1 measurement reporting according to reporting configurations $S_1$ and $S_2$, including SpCell measurements for $S_0$. As an example, a field may be present (e.g., SP field or any field providing the functionality) in a downlink control message that changes the RRC configured value or interpretation of the RRC configured value of at least one parameter related to SpCell inclusion in the reporting configuration.

In various example embodiments, for SP LTM CSI reporting on PUCCH, the MAC CE signaling of SP LTM CSI reporting on PUCCH (i.e., SP LTM CSI reporting on PUCCH activation/deactivation MAC CE) may be used to update the reporting configuration of the SP LTM CSI reporting configuration(s) being activated. As an example, a field in a MAC CE may be used to update the SpCellInclusion (i.e., SpCell inclusion) configuration of one or more SP reporting configurations being activated, such as the SP field shown in FIG. 4. In some example embodiments, the SP field (or any field that controls the inclusion of SpCell measurements in one or more reporting configurations) may be referred to as a field configuring inclusion. The field configuring inclusion may control the inclusion of SpCell reporting for one or more reporting configurations that are activated by the same message that include the field configuring inclusion. In the RRC configuration, the configuration of a SP reporting may be configured with SpCellInclusion. The UE may be expected to report the current SpCell measurements in each report associated with that reporting configuration; however, with the MAC CE activation of that SP reporting may change (e.g., remove or cause the UE to not apply the configuration) of SpCellInclusion. Thus, UE 610 may not be expected to report the current SpCell measurements in each report associated with that reporting configuration (for which the SpCell inclusion is configured to be not enabled or not 'true'). In an RRC message, the field configuring inclusion may configure the inclusion of SpCell measurements for one or more (or a specific) reporting configuration.

As shown in FIG. 4, a field in a MAC CE (e.g., a one bit field) may be used to toggle the configuration of SpCellInclusion. If the value of the field (i.e., SP field) is set to a first value (e.g., '1'), the RRC configuration of SpCellInclusion may be toggled between configured and not configured. Otherwise, if the value of the field (i.e., SP field) is set to a second value (e.g., '0'), then RRC configuration of SpCellInclusion may remain the same.

In certain example embodiments, with more than one SP reporting configuration being activated, the field may be interpreted as a common configuration used to update the SpCellInclusion configuration for multiple reporting configurations (e.g., that are being activated)) In some example embodiments, a separate field (i.e., bit) may be used for each reporting configuration to update the SpCellInclusion configuration independently. In some example embodiments, there may be at least one field controlling the SpCell inclusion associated with each of the reporting configuration activation/deactivation fields (e.g., the $S_i$ fields).

In some example embodiments, the MAC CE may include a field including a corresponding SP field associated with the activation/deactivation field (e.g., fields $S_0 \ldots S_1$ as shown in FIG. 4). The indication provided by the SP field may configure the SpCell inclusion for the associated reporting configuration.

In some example embodiments, the RRC configuration may indicate whether the SpCell inclusion can be changed by a (further) downlink control message (e.g., MAC CE or DCI).

In some example embodiments, the message providing control information (such as MAC or DCI) may control the inclusion of SpCell measurements for the measurement report. If a field is set to first value (e.g., '0') or a value indicating that SpCell inclusion is not configured, the UE may not report SpCell measurements in the measurement report. If a field is set to second value (e.g., '0') or a value indicating that SpCell inclusion is configured, the UE may report SpCell measurements in the measurement report.

According to various example embodiments, if the SP field is set to a first value (e.g., '1'), all the reporting configurations that are activated and have the SpCell inclusion configured (e.g., by RRC) may include the SpCell measurements in the report. Alternatively, if the SP field is set to a second value (e.g., '0'), all the reporting configurations that are activated and have the SpCell inclusion configured may not include the SpCell measurements in the report. Furthermore, the deactivation of a reporting configuration may reset any dynamically configured SpCell inclusion parameter.

In certain example embodiments, for SP LTM CSI reporting on PUSCH, the DCI (e.g., an existing DCI format used to schedule uplink or downlink transmissions or a new CI format that includes one or more fields used for activating/deactivating SP CSI reporting) activating or deactivating an SP LTM CSI reporting on PUSCH may be used to update the reporting configuration of the SP LTM CSI reporting configuration(s) being activated. For example, a field in the DCI (e.g., a one bit field) may be used to toggle the RRC configuration of SpCellInclusion.

In some example embodiments, for aperiodic CSI reporting on PUSCH, the DCI (e.g., DCI format used for enabling an aperiodic CSI reporting trigger state) enabling an aperiodic LTM CSI reporting on PUSCH may be used to update the reporting configuration of the aperiodic LTM CSI reporting configuration(s) being enabled. For example, a field in the DCI (e.g., a one bit field) can be used to toggle/modify/change the RRC configuration of SpCellInclusion. The DCI format that provides the selection/update of resource configurations and/or update of reporting configurations may or may not schedule any transmissions.

Some example embodiments may not include SpCell information to be reported. For example, at operation 606, source cell 620 may transmit to UE 610 a MAC CE SP on PUCCH activation for reporting configuration, which may include $S_0$ for LTM reporting configuration 1, and $S_1$ for LTM reporting configuration 2. The SP field may be set to a value indicating no SpCell inclusion. At operation 607, UE 610 may determine the SP field value to indicate no SpCell inclusion, and may apply reporting configurations $S_0$ and $S_1$ without including SpCell measurements. At operation 608, UE 610 may transmit to source cell 620 (L1) measurement reporting according to reporting configurations $S_1$ and $S_2$, without including SpCell measurements.

In some example embodiments, a field configuring inclusion (in a control message) may refer to a control information included in a control message (provided by the network). The control configuring inclusion of SpCell information in the measurement report for one or more reporting configurations (e.g., inclusion of SpCell measurements results).

In various example embodiments, the dependency between serving cell SP reporting on PUCCH and LTM SP reporting on PUCCH may be captured. Similarly, the dependency may apply to serving cell (SP) reporting on PUSCH and LTM (SP) reporting on PUSCH. For example, the activation of at least one SP LTM CSI reporting configuration on PUCCH, wherein the SP reporting configuration is associated with reporting of reference signals configured for LTM candidate cell measurements, may trigger deactivation of at least one or all of the serving cell SP CSI reporting configurations for the serving cell (e.g., on the same BWP). Similarly, the deactivation of some or all (e.g., if at least one was activated) SP LTM CSI reporting configuration on PUCCH, wherein the SP reporting configuration is associated with reporting of reference signals configured for LTM candidate cell measurements (i.e., LTM SP reporting on PUCCH), may trigger activation of previously configured at least one or all of the legacy SP reporting configurations for the serving cell (e.g., on the same BWP).

Figure 7:
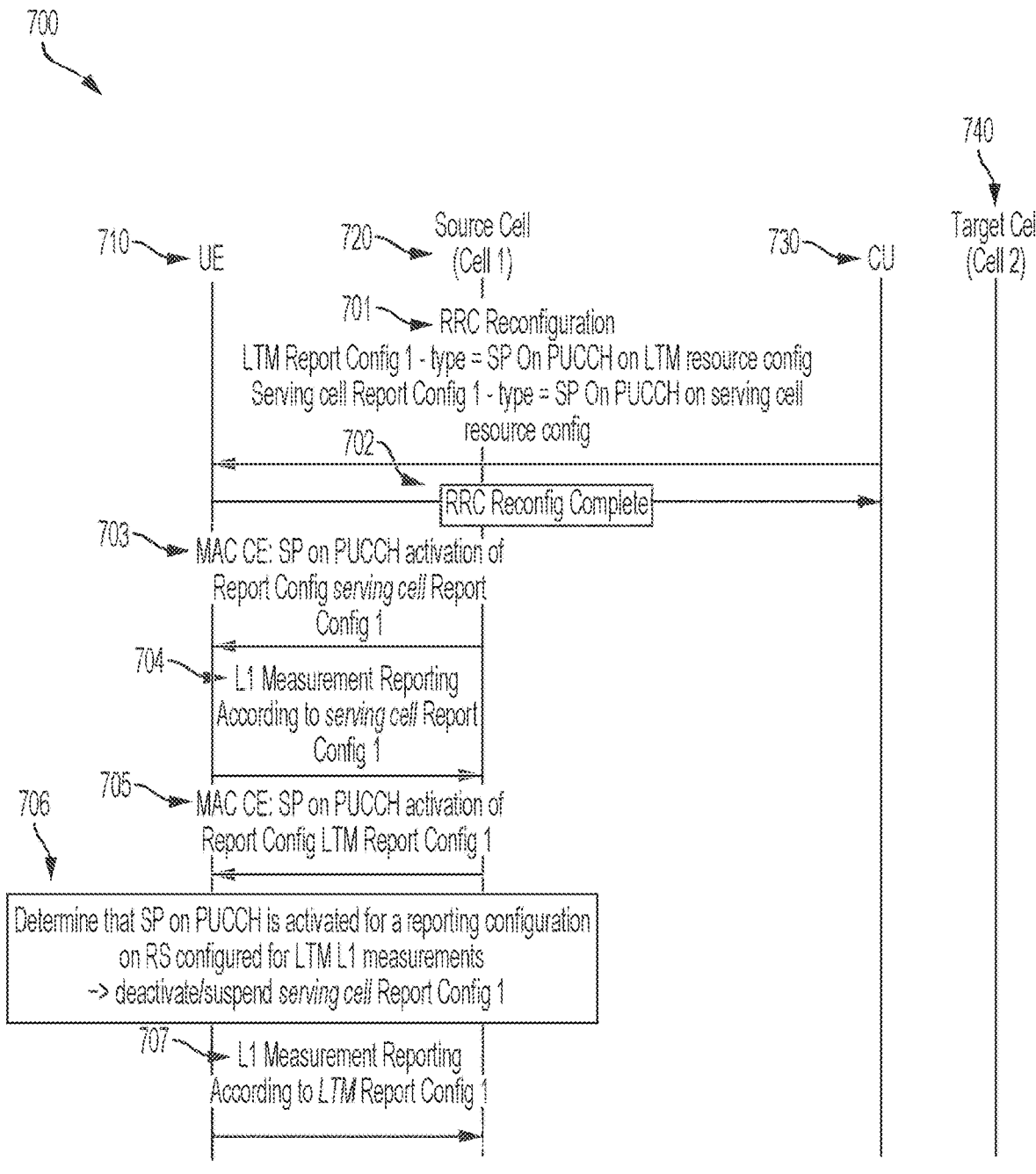
FIG. 7 illustrates an example of another signaling diagram according to various example embodiments.

FIG. 7 illustrates an example of a signaling diagram 700 for LTM/legacy dependency. UE 710 may be similar to UE 1020, and source cell 720, CU 730, and target cell 740 may be similar to NE 1010, as illustrated in FIG. 10, according to certain example embodiments.

At operation 701, CU 730 may transmit to UE 710 an RRC reconfiguration message, which may indicate LTM report configuration for SP on PUCCH on LTM resource configuration, and/or serving cell report for SP on PUCCH on a serving cell resource configuration.

At operation 702, UE 710 may transmit to CU 730 an RRC reconfiguration complete message.

At operation 703, source cell 720 may transmit to UE 710 a MAC CE SP on PUCCH activation of a reporting configuration serving cell report.

At operation 704, UE 710 may transmit to source cell 720 an L1 measurement reporting, according to the service cell report.

At operation 705, source cell 720 may transmit to UE 710 a MAC CE SP on PUCCH activation of a report configuration for LTM report configuration 1.

At operation 706, UE 710 may determine that SP on PUCCH is activated for a reporting configuration on RS configured for LTM L1 measurements. For example, UE 710 may determine to deactivate/suspend serving cell report configuration 1.

In some example embodiments, the activation of at least one SP reporting configuration on PUCCH, wherein the SP reporting configuration is associated with reporting of reference signals configured for LTM candidate cell measurements, may trigger the suspending of at least one or all of the serving cell SP CSI reporting configurations for the serving cell (e.g., on the same BWP). The suspension may cause the UE to maintain previous activation, but suspend the reporting (and the measurements related to the reporting). Whether the serving cell SP CSI reporting should be deactivated/suspended may be configured by the network. In various example embodiments, the dependency between LTM and serving cell CSI reporting may be configured by network.

In various example embodiments, if the activation of at least one SP LTM CSI reporting causes UE 710 to have activated SP reporting configurations beyond maximum number (e.g., maximum number of simultaneously active SP reporting configuration or maximum number of simultaneous CSI Reports per BWP/CC), UE 710 may determine to deactivate the serving cell SP reporting configurations on PUCCH for the serving cell starting from the highest configuration ID until the maximum number is reached.

In certain example embodiments, the SP reporting activation for LTM may cause the UE to deactivate serving cell SP CSI reporting.

In certain example embodiments, when the signaling of SP reporting on PUCCH for LTM is conveyed in a MAC CE (i.e., a field or a header in a MAC CE/DCI indicates whether the activation/deactivation of one or more SP reporting configuration applies for LTM configuration or serving cell configuration), in case the activation indicates for the LTM, UE 710 may interpret one or more fields associated with SP reporting on PUCCH configuration for LTM, and UE 710 may assume the serving cell SP configurations are deactivated (until activated again) or suspended (until LTM SP reporting is deactivated. Otherwise, in case the field indicates for the serving cell, UE 710 may assume the serving cell SP CSI reporting configurations as activated, indicated by the one or more further fields and deactivates all the LTM SP on PUCCH configurations.

At operation 707, UE 710 may transmit to source cell 720 an L1 measurement reporting according to the LTM report configuration 1.

FIG. 8 illustrates an example of a flow diagram of a method 800 that may be performed by a UE, such as UE 1020 illustrated in FIG. 10, according to various example embodiments.

At step 801, the method may include receiving, by a user equipment, from a network entity, at least one LTM CSI reporting configuration via RRC.

At step 802, the method may further include receiving, by the user equipment, from the network entity, at least one control message configured to activate or deactivate at least one of the at least one LTM CSI reporting configuration.

At step 803, the method may further include transmitting, by the user equipment, to the network entity, layer 1 measurement reporting according to at least one of the at least one control message.

In certain example embodiments, the at least one LTM CSI reporting configuration may include at least one parameter configuring inclusion, in the L1 measurement reporting, of at least one measurement result according to at least one of the at least one LTM CSI reporting configurations. In some example embodiments, the at least one control message may include at least one field configuring inclusion, in the L1 measurement reporting, of at least one measurement result according to at least one of the at least one LTM CSI reporting configurations. The at least one included measurement result may include at least one primary cell measurement.

In various example embodiments, the at least one control message may include at least one indication of a LTM CSI reporting configuration identifier indicating whether to update at least one LTM CSI or at least one serving cell CSI reporting configuration. The at least one indication may include at least one of a serving cell/layer 1/2 triggered mobility field or logical channel identifier.

In certain example embodiments, the at least one control message may include of at least one of a medium access control element or downlink control information command.

In some example embodiments, at least one control message is configured to deactivate the at least one LTM CSI reporting configuration, and the method may further include at least one of suspending, by the user equipment, at least one serving cell CSI reporting configuration, or deactivating, by the user equipment, at least one serving cell CSI reporting configuration.

In various example embodiments, the activation of at least one LTM CSI reporting configuration further includes determining, by the user equipment, to continue or activate at least one previously suspended or deactivated serving cell CSI reporting configuration.

In certain example embodiments, the user equipment may be configured for semi-persistent LTM CSI reporting on PUCCH, and the LTM CSI reporting configuration identifier may be configured to update and activate the at least one LTM CSI reporting configuration.

In some example embodiments, the user equipment is configured for SP LTM CSI reporting on PUSCH, and the LTM CSI reporting configuration identifier may be configured to update and activate the at least one LTM CSI reporting configuration.

In various example embodiments, the method may further include receiving, by the user equipment, from the network entity, one or more LTM CSI reporting configurations via RRC including at least one parameter associated with inclusion of one or more measurement results in the measurement report of the one or more reporting configurations; determining, by the user equipment, to update the information on inclusion of one or more measurement results based on the indication; and updating, by the user equipment, at least one LTM CSI reporting configuration.

Figure 9:
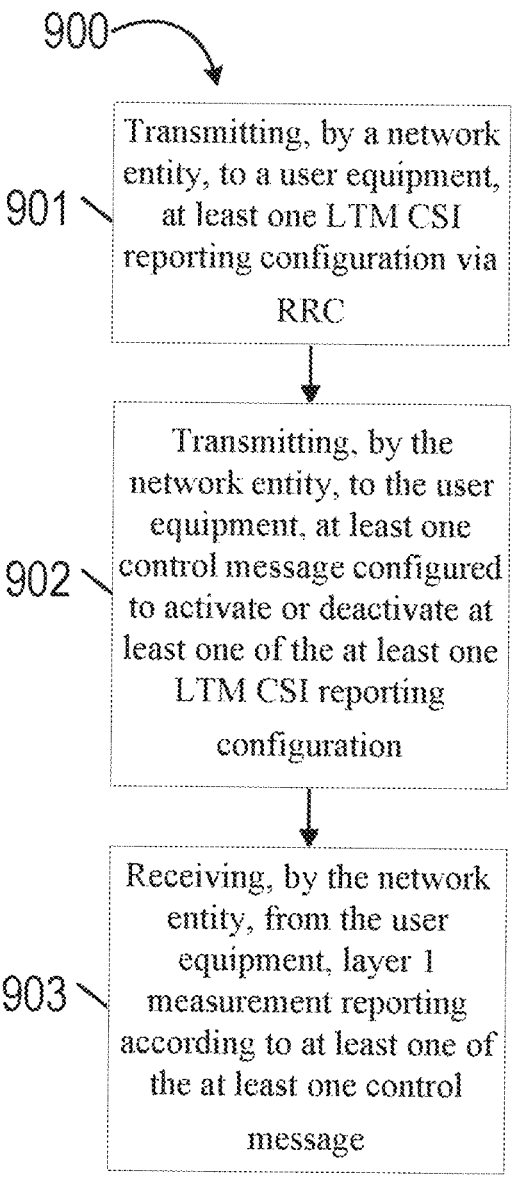
FIG. 9 illustrates an example of a flow diagram of a method according to certain example embodiments.

FIG. 9 illustrates an example of a flow diagram of a method 900 that may be performed by a NE, such as NE 1010 illustrated in FIG. 10, according to various example embodiments.

At step 901, the method may include transmitting, by a network entity, to a user equipment, at least one LTM CSI reporting configuration via RRC.

At step 902, the method may further include transmitting, by the network entity, to the user equipment, at least one control message configured to activate or deactivate at least one of the at least one LTM CSI reporting configuration.

At step 903, the method may further include receiving, by the network entity, from the user equipment, layer 1 measurement reporting according to at least one of the at least one control message.

In certain example embodiments, the at least one LTM CSI reporting configuration may include at least one parameter configuring inclusion, in the L1 measurement reporting, of at least one measurement result according to at least one of the at least one LTM CSI reporting configurations.

In some example embodiments, the at least one control message includes at least one field configuring inclusion, in the L1 measurement reporting, of at least one measurement result according to at least one of the at least one LTM CSI reporting configurations.

In various example embodiments, the at least one included measurement result includes at least one primary cell measurement.

In certain example embodiments, the at least one control message may include at least one indication of a LTM CSI reporting configuration identifier indicating whether to update at least one LTM CSI or at least one serving cell CSI reporting configuration.

In some example embodiments, the at least one indication may include at least one of a serving cell/layer 1/2 triggered mobility field or logical channel identifier.

In various example embodiments, the at least one control message may include at least one of a MAC CE or DCI command.

In certain example embodiments, the user equipment may be configured for SP LTM CSI reporting on PUCCH, and the LTM CSI reporting configuration identifier may be configured to update and activate the at least one LTM CSI reporting configuration.

In some example embodiments, the user equipment is configured for SP LTM CSI reporting on PUSCH, and the LTM CSI reporting configuration identifier is configured to update and activate the at least one LTM CSI reporting configuration.

In various example embodiments, the method may further include transmitting, by the network entity, to the user equipment, one or more LTM CSI reporting configurations via RRC including at least one parameter configuring inclusion of one or more measurement results in the measurement report of the one or more reporting configurations.

FIG. 10 illustrates an example of a system according to certain example embodiments. In one example embodiment, a system may include multiple devices, such as, for example, NE 1010 and/or UE 1020.

NE 1010 may be one or more of a base station (e.g., 3G UMTS NodeB, 4G LTE Evolved NodeB, or 5G NR Next Generation NodeB), a serving gateway, a server, and/or any other access node or combination thereof.

NE 1010 may further include at least one gNB-centralized unit (CU), which may be associated with at least one gNB-distributed unit (DU). The at least one gNB-CU and the at least one gNB-DU may be in communication via at least one F1 interface, at least one $X_n$-C interface, and/or at least one NG interface via a 5th generation core (5GC).

UE 1020 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, NE 1010 and/or UE 1020 may be one or more of a citizens broadband radio service device (CBSD).

NE 1010 and/or UE 1020 may include at least one processor, respectively indicated as 1011 and 1021. Processors 1011 and 1021 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1012 and 1022. The memory may be fixed or removable. The memory may include computer program instructions or computer code contained therein. Memories 1012 and 1022 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1011 and 1021, memories 1012 and 1022, and any subset thereof, may be configured to provide means corresponding to the various blocks of FIGS. 5-9. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 10, transceivers 1013 and 1023 may be provided, and one or more devices may also include at least one antenna, respectively illustrated as 1014 and 1024. The device may have many antennas, such as an array of antennas configured for multiple input multiple output (MIMO) communications, or multiple antennas for multiple RATs. Other configurations of these devices, for example, may be provided. Transceivers 1013 and 1023 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 5-9). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 5-9. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 11:
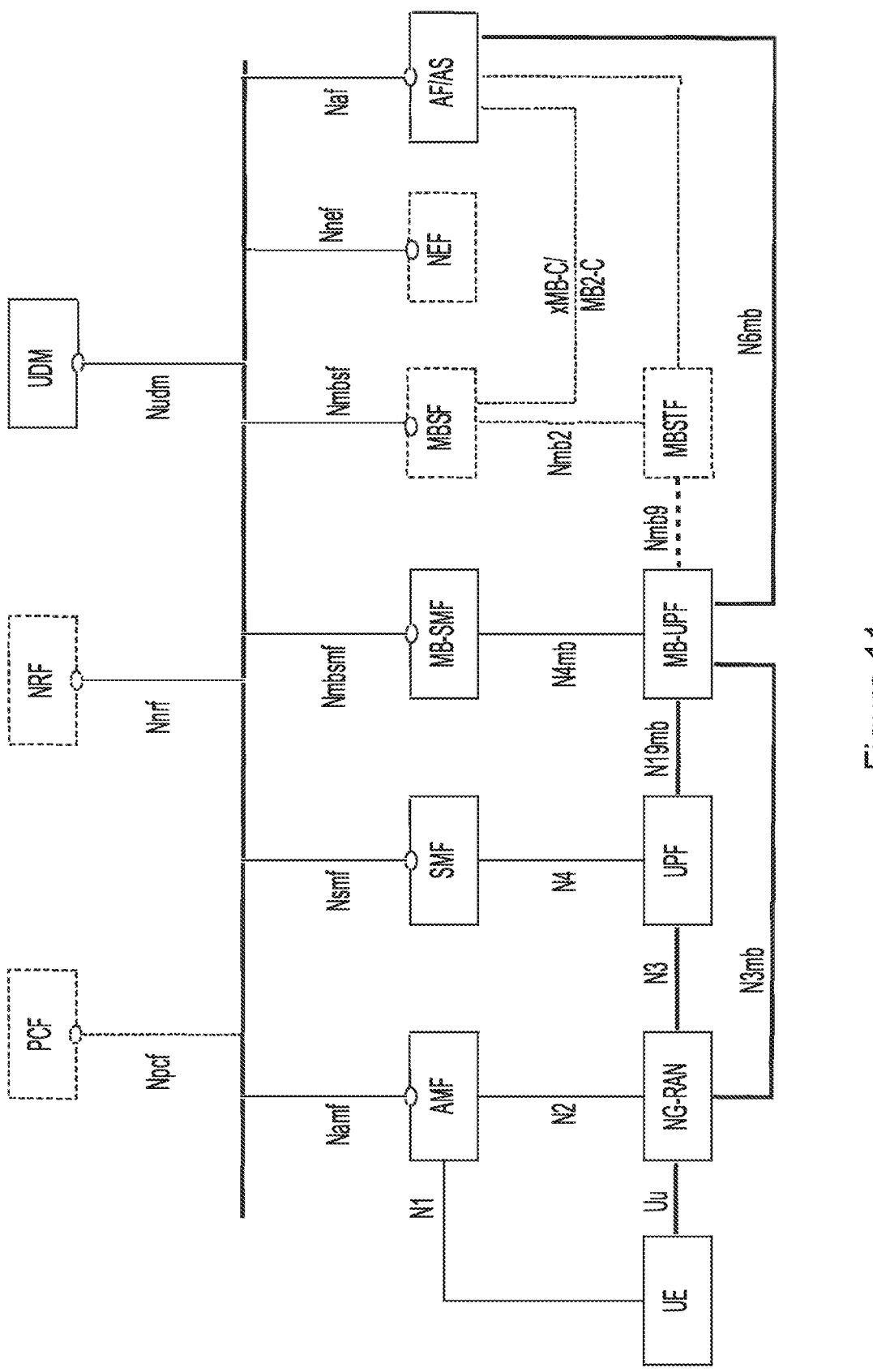
FIG. 11 illustrates an example of a 5G network and system architecture according to certain example embodiments.

FIG. 11 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 11 may be similar to NE 1010 and UE 1020, respectively. The user plane function (UPF) may provide services such as intra-RAT and inter-RAT mobility, routing and forwarding of data packets, inspection of packets, user plane quality of service (QOS) processing, buffering of downlink packets, and/or triggering of downlink data notifications. The application function (AF) may primarily interface with the core network to facilitate application usage of traffic routing and interact with the policy framework.

According to certain example embodiments, processors 1011 and 1021, and memories 1012 and 1022, may be included in or may form a part of processing circuitry or control circuitry. In addition, in some example embodiments, transceivers 1013 and 1023 may be included in or may form a part of transceiving circuitry.

In some example embodiments, an apparatus (e.g., NE 1010 and/or UE 1020) may include means for performing a method, a process, or any of the variants discussed herein. Examples of the means may include one or more processors, memory, controllers, transmitters, receivers, and/or computer program code for causing the performance of the operations.

In various example embodiments, apparatus 1020 may be controlled by memory 1022 and processor 1021 to receive, from a network entity, at least one LTM CSI reporting configuration via RRC; receive, from the network entity, at least one control message configured to activate or deactivate at least one of the at least one LTM CSI reporting configuration; and transmit, to the network entity, L1 measurement reporting according to at least one of the at least one control message.

Certain example embodiments may be directed to an apparatus that includes means for performing any of the methods described herein including, for example, means for receiving, from a network entity, at least one LTM CSI reporting configuration via RRC; means for receiving, from the network entity, at least one control message configured to activate or deactivate at least one of the at least one LTM CSI reporting configuration; and means for transmitting, to the network entity, L1 measurement reporting according to at least one of the at least one control message.

In various example embodiments, apparatus 1010 may be controlled by memory 1012 and processor 1011 to transmit, to a user equipment, at least one LTM CSI reporting configuration via RRC; transmit, to the user equipment, at least one control message configured to activate or deactivate at least one of the at least one LTM CSI reporting configuration; and receive, from the user equipment, L1 measurement reporting according to at least one of the at least one control message.

Certain example embodiments may be directed to an apparatus that includes means for performing any of the methods described herein including, for example, means for transmitting, to a user equipment, at least one LTM CSI reporting configuration via RRC; means for transmitting, to the user equipment, at least one control message configured to activate or deactivate at least one of the at least one LTM CSI reporting configuration; and means for receiving, from the user equipment, L1 measurement reporting according to at least one of the at least one control message.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

3GPP $3^{rd}$ Generation Partnership Project

5G $5^{th}$ Generation

5GC $5^{th}$ Generation Core

6G $6^{th}$ Generation

ACK Acknowledgement

AF Application Function

AM Acknowledge Mode

AMF Access and Mobility Management Function

ASIC Application Specific Integrated Circuit

BM Beam Management

BWP Bandwidth Part

CBSD Citizens Broadband Radio Service Device

CC Component Carrier

CE Control Element

CFRA Contention Free Random Access

CPU Central Processing Unit

CQI Channel Quality Indicator

CRI Channel State Information Reference Signal Resource Indicator

C-RNTI Cell-Radio Network Temporary Identifier

CSI Channel State Information

CU Centralized Unit

US 12,633,988 B2

23 dB decibel
dBm decibel-milliwatts
DRB Data Radio Bearer
DU Distributed Unit
eMBB Enhanced Mobile Broadband
eNB Evolved Node B
gNB Next Generation Node B
GPS Global Positioning System
HARQ Hybrid Automatic Repeat Request
HDD Hard Disk Drive
ID Identifier
IE Information Element
IoT Internet of Things
L1 Layer 1
L2 Layer 2
LCID Logical Channel Identifier
L1 Layer Indicator
LTE Long-Term Evolution
LTE-A Long-Term Evolution Advanced
LTM Layer 1/2 Triggered Mobility
MAC Medium Access Control
MEMS Micro Electrical Mechanical System
MIMO Multiple Input Multiple Output
mMTC Massive Machine Type Communication
NE Network Entity
NG Next Generation
NG-eNB Next Generation Evolved Node B
NG-RAN Next Generation Radio Access Network
NR New Radio
PBCH Physical Broadcast Channel
PCell Primary Cell
PCI Physical Cell Identity
PDA Personal Digital Assistance
PDCCH Physical Downlink Control Channel
PDCP Packet Data Convergence Protocol
PDSCH Physical Downlink Shared Channel
PMI Precoding Matrix Indicator
PSCell Primary Secondary Cell
PUCCH Physical Uplink Control Channel
PUSCH Physical Uplink Shared Channel
QoS Quality of Service
RACH Radio Access Channel
RAM Random Access Memory
RAN Radio Access Network
RAR Random Access Response
RAT Radio Access Technology
RF Radio Frequency
RI Rank Indicator
ROM Read-Only Memory
RRC Radio Resource Control
RSRP Reference Signal Received Power
SCS Subcarrier Spacing
SINR Signal-to-Interference-Plus-Noise Ratio
S/L Serving cell/LTM
SP Semi-Persistent
SpCell Special Cell
SS Synchronization Signal
SSB Synchronization Signal Block
SSBRI Synchronization Signal Physical Broadcast Channel Resource Indicator
TA Timing Advance
TCI Transmission Configuration Indicator
UE User Equipment
UL Uplink
UMTS Universal Mobile Telecommunications System
UPF User Plane Function

24

URLLC Ultra-Reliable and Low-Latency Communication
UTRAN Universal Mobile Telecommunications System Terrestrial Radio Access Network

We claim:

1. An apparatus comprising:
at least one processor; and
at least one memory storing instructions that, when executed by the at least one processor, cause the apparatus at least to:
receive, from a network entity via radio resource control (RRC) signaling, at least one layer 1/2 triggered mobility (LTM) channel state information (CSI) reporting configuration and at least one serving cell CSI reporting configuration;
receive, from the network entity, at least one control message configured to activate or deactivate at least one of the at least one LTM CSI reporting configuration or at least one of the at least one serving cell CSI reporting configuration, wherein the at least one control message comprises a bit field for indicating whether the at least one control message is for an LTM CSI reporting or for a serving cell CSI reporting; and
based on the bit field indicating that the at least one control message is for the LTM CSI reporting, transmit, to the network entity, layer 1 measurement reporting according to the at least one of the at least one LTM CSI reporting configuration.

2. The apparatus of claim 1, wherein the at least one LTM CSI reporting configuration comprises at least one parameter configuring inclusion, in the L1 measurement reporting, of at least one measurement result according to at least one of the at least one LTM CSI reporting configuration.

3. The apparatus of claim 2, wherein the at least one included measurement result comprises at least one primary cell measurement.

4. The apparatus of claim 1, wherein the control message comprises at least one field configuring inclusion, in the L1 measurement reporting, of at least one measurement result according to at least one of the at least one LTM CSI reporting configuration.

5. The apparatus of claim 1, wherein the at least one control message comprises at least one of a serving cell/layer 1/2 triggered mobility field or logical channel identifier.

6. The apparatus of claim 1, wherein the at least one control message comprises at least one of a medium access control element or downlink control information command.

7. The apparatus of claim 1, wherein at least one control message is configured to deactivate the at least one LTM CSI reporting configuration, and wherein the at least one memory and the instructions, when executed by the at least one processor, further cause the apparatus to at least one of:
suspend at least one serving cell CSI reporting configuration; or
deactivate at least one serving cell CSI reporting configuration.

8. The apparatus of claim 1, wherein the activation of at least one LTM CSI reporting configuration further comprises the at least one memory and the instructions, when executed by the at least one processor, to further cause the apparatus at least to:
determine to continue or activate at least one previously suspended or deactivated serving cell CSI reporting configuration.

9. The apparatus of claim 1, wherein the apparatus is configured for semi-persistent LTM CSI reporting on physical uplink control channel, and the LTM CSI reporting configuration identifier is configured to update and activate the at least one LTM CSI reporting configuration.

10. The apparatus of claim 1, wherein the user equipment is configured for semi-persistent (SP) LTM CSI reporting on physical uplink shared channel (PUSCH), and the LTM CSI reporting configuration identifier is configured to update and activate the at least one LTM CSI reporting configuration.

11. The apparatus of claim 1, wherein the at least one memory and the instructions, when executed by the at least one processor, further cause the apparatus at least to:

receive, from the network entity, one or more LTM CSI reporting configurations via radio resource configuration comprising at least one parameter associated with inclusion of one or more measurement results in the measurement report of the one or more reporting configurations;

determine to update the information on inclusion of one or more measurement results based on the indication; and update at least one LTM CSI reporting configuration.

12. An apparatus comprising:

at least one processor; and at least one memory storing instructions that, when executed by the at least one processor, cause the apparatus at least to:

transmit, to a user equipment via radio resource control (RRC) signaling, at least one layer 1/2 triggered mobility (LTM) channel state information (CSI) reporting configuration and at least one serving cell CSI reporting configuration;

transmit, to the user equipment, at least one control message configured to activate or deactivate at least one of the at least one LTM CSI reporting configuration or at least one of the at least one serving cell CSI reporting configuration, wherein the at least one control message comprises a bit field for indicating whether the control message is for an LTM CSI reporting or for a serving cell CSI reporting; and based on the bit field indicating that the at least one control message is for the LTM CSI reporting, receive, from the user equipment, layer 1 measurement reporting according to the at least one of the at least one LTM CSI reporting configuration.

13. The apparatus of claim 12, wherein the at least one LTM CSI reporting configuration comprises at least one parameter configuring inclusion, in the L1 measurement reporting, of at least one measurement result according to at least one of the at least one LTM CSI reporting configuration.

14. The apparatus of claim 13, wherein the at least one included measurement result comprises at least one primary cell measurement.

15. The apparatus of claim 12, wherein the at least one control message comprises at least one field configuring inclusion, in the L1 measurement reporting, of at least one measurement result according to at least one of the at least one LTM CSI reporting configuration.

16. The apparatus of claim 12, wherein the at least one control message comprises at least one of a serving cell/layer 1/2 triggered mobility field or logical channel identifier.

17. The apparatus of claim 12, wherein the at least one control message comprises at least one of a medium access control element or downlink control information command.

18. The apparatus of claim 12, wherein the at least one memory and the instructions, when executed by the at least one processor, further cause the apparatus at least to:

transmit, to the user equipment, one or more LTM CSI reporting configurations via radio resource configuration comprising at least one parameter configuring inclusion of one or more measurement results in the measurement report of the one or more reporting configurations.

* * * * *